United States Patent [19]

Schneider et al.

[11] Patent Number: 4,638,722
[45] Date of Patent: Jan. 27, 1987

[54] BELLOWS

[75] Inventors: Barbara Schneider, Landsham; Kurt Hennig, Munich; Manfred Klein, Ismaning, all of Fed. Rep. of Germany

[73] Assignee: Gebr. Hennig GmbH, Ismaning, Fed. Rep. of Germany

[21] Appl. No.: 443,468

[22] Filed: Nov. 22, 1982

[30] Foreign Application Priority Data

Dec. 14, 1981 [DE] Fed. Rep. of Germany ....... 3149428

[51] Int. Cl.$^4$ ............................................. F01B 19/00
[52] U.S. Cl. ........................................... 92/42; 92/34; 92/46
[58] Field of Search ................... 92/34, 42, 45, 46

[56] References Cited

U.S. PATENT DOCUMENTS

| 367,744 | 8/1887 | Davis | 92/42 |
| 1,151,777 | 8/1915 | Fulton | 92/42 |
| 1,345,971 | 7/1920 | Star | 92/42 |
| 2,056,106 | 9/1936 | Kuhn | 92/42 |
| 2,711,315 | 6/1955 | Mosebach | 92/42 |
| 3,707,937 | 1/1973 | Liles | 92/42 |
| 3,851,567 | 12/1974 | Thompson | 92/42 |

Primary Examiner—Abraham Hershkovitz
Attorney, Agent, or Firm—Learman & McCulloch

[57] ABSTRACT

A bellows for protecting spindles, guideways, and the like of machine tools comprises a pleated cover having inner and outer cover elements and support members between adjacent pleats. The inner cover element has inwardly extending flaps which may be secured to the support members or to each other to form such support members.

19 Claims, 14 Drawing Figures

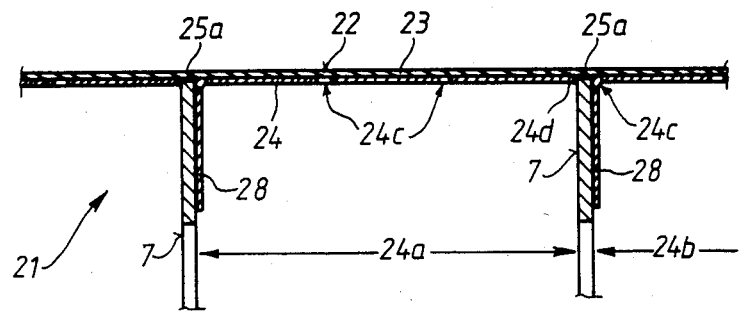
FIG.6
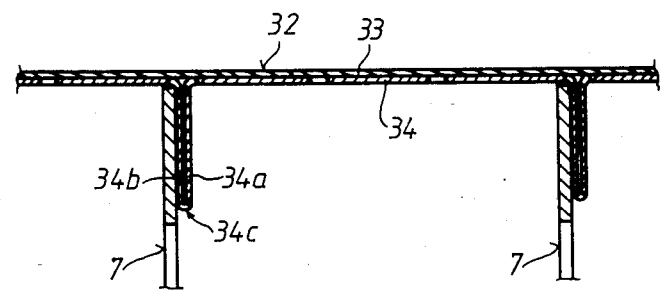
FIG.7
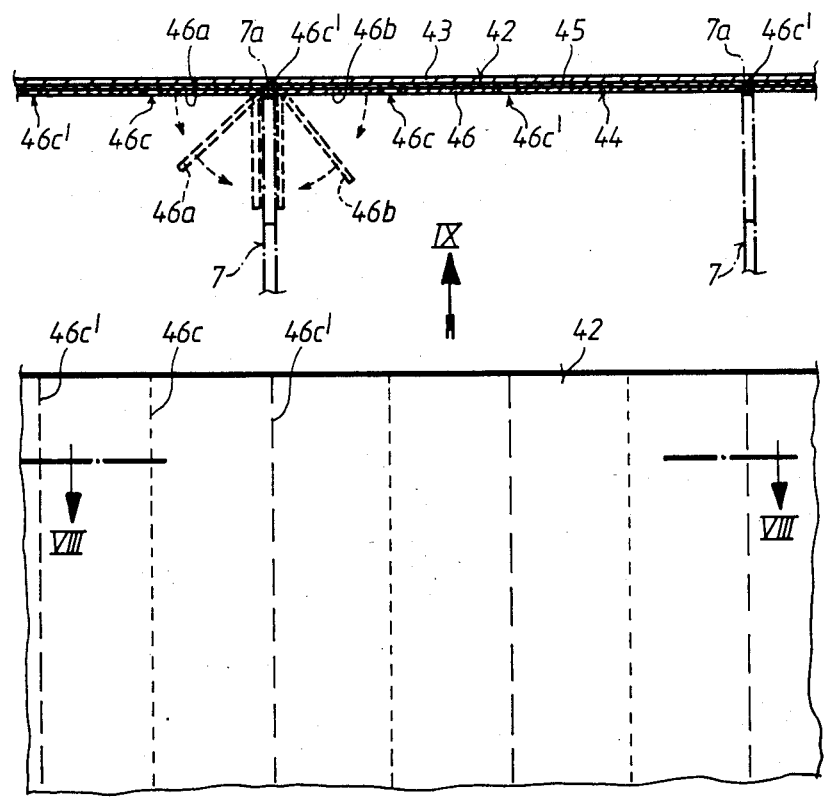
FIG. 8
FIG. 9

BELLOWS

The invention relates to a bellows comprising inner and an outer cover elements and support members which are arranged between individual pleats and serve for support.

Bellows of the type referred to above serve for example for the protection of spindles and guideways on machine tools.

In order to support and guide the bellows, support members made from rigid material (e.g. plastic, metal) are arranged between individual pleats and distributed a certain distance apart over the length of the bellows. The necessary connection of these support members arranged inside the bellows to the cover of the bellows is effected in the known constructions by stitching them to the cover of the bellows. The significant disadvantage of these constructions lies in the high outlay on production engineering associated with the stitching operation; added to this, the cover of the bellows is punctured in an undesirable manner by the stitches and the working length of the bellows is reduced.

In other known constructions the support members are connected to the outer edges of the pleats by adhesion or welding. However, since the connection zones here are relatively small care must be taken to ensure a very good adhered or welded connection in order to guarantee the desired durability of the connection, quite apart from the fact that the welding requires correspondingly costly tooling.

Constructions are also known in which support members which have slots in the longitudinal direction are used, parts of the cover of the bellows being inserted in these slots and thus connected to the support member. Because of the necessary special design of the support members this construction also involves considerable manufacturing costs.

Bellows constructions are also known in which wire straps are connected to the bellows with the aid of flaps which are also mounted on the inner pleats. In addition to the costly insertion and mounting of the wire straps an undesirable strain is also produced because when the bellows is extended the inner pleats move outwards resulting in considerable opposing strains between the wire straps and the inner pleats which can very easily cause the adhered flaps to peel off.

The object of the invention therefore is to avoid the shortcomings of the known constructions and to construct a bellows of the type referred to in the introduction in such a way that particularly simple manufacture is achieved—with satisfactory connection of the support members to the cover of the bellows.

This object is achieved according to the invention in that the inner cover element forms flap-like ends which project freely towards the interior of the bellows from the region of the inner cover element connected to the outer cover element and which are connected level with the support members or which themselves form the support members.

In this bellows according to the invention parts of the inner cover element, namely the flap-like elements, are thus folded out of the region of the outer cover element in the direction of the interior of the bellows and connected level with the surface facing it of the support members to be arranged there, which can preferably be achieved by adhesion or welding.

It is particularly advantageous for the inner cover element to contain in a manner which is known per se a sheet which is firmly connected to the outer cover element and has perforations along the outer and/or the inner edges of the pleats. In this way not only is the pleating of the inner cover element and thus of the cover in general made easier, but it also makes the formation of the flap-like ends easier, so that the length of a flap-like end (viewed in the general longitudinal direction of the bellows) corresponds approximately to the material height of a pleat, so that the flap-like mounting end for a relevant support member can be formed by corresponding cutting and reversing or corresponding close pleating of the inner cover element thus formed. In case of need the length of the inner cover element can be chosen to be greater (e.g. about the overall length of the flap-like ends provided) than the outer cover element. However, the flap-like ends can be constructed in such a way that at the appropriate points they can be simply folded out of the inner cover element against the relevant support member.

In any case, however, a very durable mounting of the support members which is well protected against wear even during rough operation can be achieved with the most simple, time-saving production. Particular advantages of this bellows according to the invention reside in the fact that with the proposed construction of the inner cover element of the bellows cover a marked definition of the individual pleats and extremely good stiffening can be produced at the same time, and this stiffening of the pleats can be defined by a corresponding construction of the (plastic) sheet of the inner cover element. In particular the fact should be emphasised that the bellows according to the invention can be drawn out practically to its full extent (into a position in which the bellows cover forms a more or less level surface) without there being the slightest tendency for the flap-like ends which are connected level with the support members to peel off or become detached from the support members. These support members are also reliably connected by means of their flat connection to the flap-like ends via the relevant inner cover element to the outer cover element and thus to the whole bellows cover. Thus a support member can be applied in any number of pleats, e.g. in every pleat, in every second pleat, in every third pleat, etc. A plurality of support members means that is is always possible to draw out the bellows to its fullest extent, whilst on the other hand the bellows can be compressed to an extremely small dimension which is largely determined only by the material thickness of the pleats, the flap-like ends and the support members.

Some embodiments of the invention are illustrated in the drawings and are described in greater detail below. In the drawings:

FIGS. 6 and 7 show enlarged partial sectional views through the extended (unfolded) bellows in the region of two support frames to illustrate two further embodiments;

FIG. 8 shows a partial longitudinal sectional view through the fully extended bellows in a further embodiment (section approximately along the line VIII—VIII in FIG. 9);

FIG. 9 shows a partial bottom view of the bellows approximately according to the arrow IX in FIG. 8;

The first embodiment of the bellows will be explained with the aid of FIGS. 1 to 5. This bellows 1 is intended for example to protect a substantially flat guideway (not shown in detail) on a machine tool, and extends transversely over the breadth of the guideway to be protected and encloses the latter with arms 1a, 1b (FIG. 1) which are angled laterally downwards and are connected at their upper ends by a central section 1c, as is usual. The length of the bellows 1 in the direction of extension (cf. for example FIG. 2) can be readily adapted to the respective length of the guideway or the cover length of this guideway.

Figure 1:
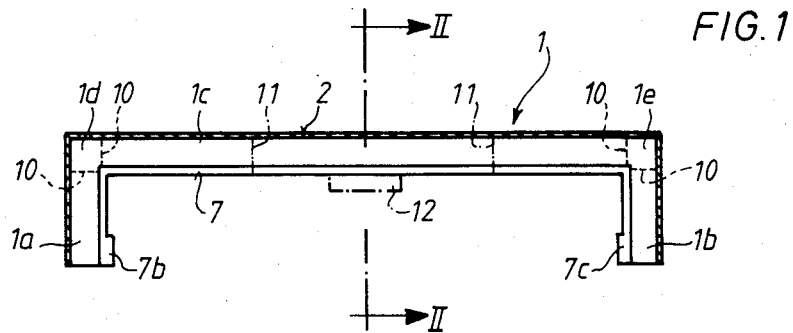
FIG. 1 shows a cross-sectional view (along the line I—I in FIG. 2) through the bellows.
Figure 2:
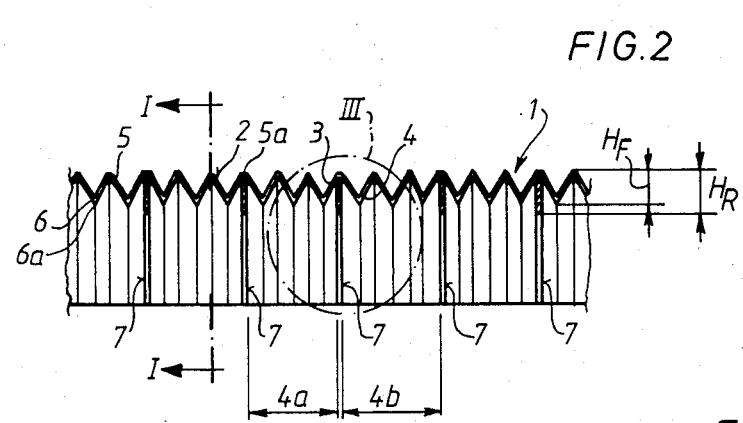
FIG. 2 shows a partial longitudinal sectional view through the bellows, approximately along the line II—II in FIG. 1.
Figure 3:
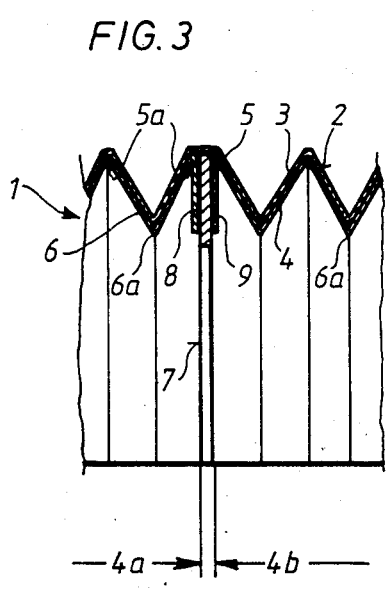
FIG. 3 shows a partial sectional view on an enlarged scale in the region of a support frame (corresponding to the section III in FIG. 2)

Referring particularly to FIGS. 1 to 3, the bellows 1 contains as its essential parts a cover 2, which consists of an outer cover element 3 and an inner cover element 4 with outer and inner pleats 5 and 6 respectively constructed in this cover 2, and support members which are arranged between individual pleats 5, 6, serve for support and are preferably formed by support frames 7. These support frames or reinforcements 7 can be made in the usual way from relatively flat rigid material (e.g. wood, plastic, metal) and they lie—cf. in particular FIGS. 2 and 3—substantially in transverse planes running at right angles to the general surface of the bellows.

In this bellows 1 the outer cover element 3 can be made from any suitable resistant and flexible material (e.g. artificial leather or the like) and this material is substantially continuous. The inner cover element 4 is firmly connected to the outer cover element and preferably forms a flat stiffening. In contrast to the outer cover element 3 the inner cover element has a greater length, the excess of which is taken up by flap-like sections or parts 4a, 4b spaced apart in the longitudinal direction of the bellows 1, as indicated in FIG. 2 by the parts 4a, 4b. The number and length of these parts of the inner cover element 4 are determined by the number and spacing of the support frames 7 distributed in the longitudinal direction of the bellows 1. Each support frame 7 is arranged between two flap-like ends 8, 9 (cf. FIG. 3) of adjacent parts, e.g. 4a, 4b, of the inner cover element 4 and connected level therewith, preferably by adhesion or welding. This means, therefore, that every part, e.g. 4a, 4b, of the inner cover element 4 provided between two successive support frames 7 is made longer than the outer cover element at each end section by the length of the corresponding flap-like end 8 or 9 in the longitudinal region of these parts.

The flat stiffening forming the inner cover element 4 is preferably formed by a sheet with perforations 4c (FIG. 5) provided along the outer and inner edges 5a and 6a respectively of the pleats of the bellows 1. This sheet is advantageously made from a stiffening plastic material which makes the inner cover element particularly resistant.

In this construction of the inner cover element 4 out of the stiffening plastic sheet the perforation is broken in each cases at the points on the bellows 1 intended to receive the support frames 7, and in this way the parts (e.g. 4a, 4b) of the inner cover element 4 are formed. In each case two parts, e.g. 4a, 4b, which are adjacent to each other meet with their last unbroken perforation on an outer pleat edge 5a, so that the flap-like ends 8, 9 of two parts 4a and 4b respectively adjoining these perforations are firmly connected for example by adhesion to the surfaces which face them of the support frame 7.

Figure 4:
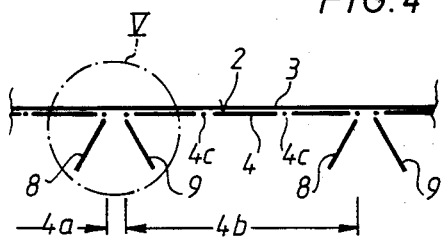
FIG. 4 shows a completely schematic longitudinal sectional view through the bellows cover before the insertion of a support frame.

An unfolded part of the length of the bellows cover 2 is shown quite schematically in FIG. 4. It can be seen here that the outer cover element 3 (solid line) is not interrupted over its length, whereas the inner cover element (dash-dot line) is divided into parts 4a, 4b . . . , and each of the two end sections of the parts has an inwardly curved flap-like end 8 or 9. In this illustration it is assumed that the points 4c on the dash-dot line which represents the inner cover element 4 designate the perforation lines and thus the fold lines for the production of the pleats.

Figure 5:
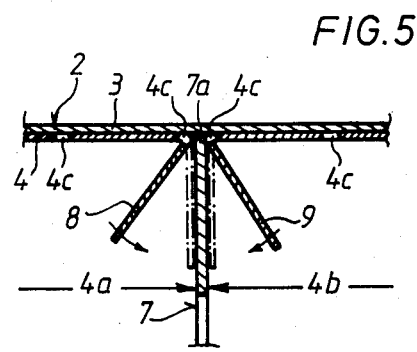
FIG. 5 shows an enlarged sectional view (section V in FIG. 4) to illustrate the process of fixing a support frame.

In the detail sectional view according to FIG. 5 (section V in FIG. 4) a support frame 7 which is supported by its outer edge 7a on the inner surface of the outer cover element 3 is inserted between the last unbroken perforations 4c which lie opposite one another an appropriate distance apart on the two adjacent parts 4a, 4b. In order to fix the support frame 7 in its position on the cover 2, the two flap-like ends 8, 9 of the parts 4a, 4b are folded in the direction of the arrows against the support frame 7 and thus connected level therewith—after appropriate adhesive has been applied for example to the surfaces facing each other of these ends and of the support frame 7. This arrangement and fixing of the support frame 7 inside the bellows 1 can be achieved in a very simple and rapid manner.

Consideration of the drawings (especially FIGS. 2 and 3) makes it very clear that the bellows 1 can be compressed to an extremely small minimum dimension and can be practically completely extended to form an almost flat surface. So that the compression of the bellows 1 is not hindered in any way it is particularly advantageous in this bellows 1 (with the bends for the side arms 1a, 1b) if regions of the material of the inner cover element are broken in the region of each corner section 1d, 1e, as indicated by broken lines 10 in FIG. 1.

The number of support frames 7 to be provided in such a bellows can be chosen as desired as a function of the supporting width, the installation conditions, etc. In an extreme case it is even possible for a support frame 7 to be associated with every outer pleat 5.

In the illustrated embodiment it is also assumed that the support frames 7 extend over the whole width of the bellows 1 (cf. FIG. 1). However, there are applications in which the support frames can be constructed in parts, i.e. each support frame only consists of at least two sections which can be adhered or welded in the manner described at a distance from each other. In this case it is preferable for frame parts to be arranged at least in the region of the end or corner sections; therefore in FIG. 1 each inwardly directed end edge 11 of such a corner frame part is indicated by broken lines, whilst the space between the end edges 11 facing one another of the two frame parts belonging to one support frame remains free.

However, in each construction of the support frame its height $H_R$ (FIG. 2) in any extended position of the bellows 1 will always be greater than the height $H_F$ of the pleats, so that the inner edges of the support frame 7 always project inwards with reference to the inner edges 6a of the pleats.

Furthermore, individual inwardly-projecting slide or guide parts can be mounted on the inner edges of at least some support frames 7, as is shown by broken lines for example in the central region at 12.

Also in FIG. 1 an inwardly-projecting angular formation 7b, 7c is provided in the region of the lower ends of each side arm 1a, 1b of the bellows 1 on at least some support frames, and these angular formations 7b, 7c can also act as slide or guide elements in relation to the guideway of the machine tool.

Whilst in the first embodiment each support frame 7 is connected at both its end faces level with a corresponding flap-like end 8, 9 of the inner element 4, it is also possible to adhere or weld each support at only one of its end faces to a flap-like end of the cover element formed there, as is illustrated in two examples in FIGS. 6 and 7. It is presupposed in both embodiments (FIGS. 6 and 7) that the support frame can be constructed as in the first embodiment, so the same reference numeral 7 is used here for the support frame.

In the embodiment according to FIG. 6 it is also assumed that the cover 22 of this bellows 21 consists of an outer cover element 23 and an inner cover element 24. Here too the inner cover element 24 can be formed by a stiffening plastic sheet with perforations 24c along the outer and inner pleat edges. Furthermore, this inner cover element 24 is composed of a plurality of parts, e.g. 24a, 24b, which are adjacent to each other, and the support members 7 are received at the point of separation between adjacent parts of the inner cover element 24. In this embodiment (FIG. 6) one part 24b of any two adjacent parts, e.g. 24a, 24b, rests with its last unbroken perforation 24c opposite the separated end 24d of the other part 24a at a small distance on an outer pleat edge 25a, and the flap-like end 2 formed on this part 24b projects from the rest of the inner cover element 24 towards the interior of the bellows and is adhered or welded to the side facing it of the support member 7. The adjacent separated end 24d of the other part 24a, on the other hand, rests level on the inner surface of the outer cover element 23 and can optionally be adhered or welded thereto.

In the embodiment according to FIG. 7, as in the preceding embodiments, the inner cover element 34 of the cover 32 which is firmly connected to the outer cover element 33 is formed by a single sheet which is perforated along the outer and inner pleat edges of the bellows. However, in this third embodiment the sheet forming the inner cover element 34 is of continuous construction, i.e. it is not divided into parts. So that in this case too the support frames 7 can be arranged and fixed in an equally stable, simple and time-saving manner at the points provided for the purpose on the bellows, in each case two parts 34a and 34b of the inner cover element which are adjacent to each other and connected by a perforation 34c are connected level with each other to form a pleat-like and flap-like end directed towards the interior of the bellows, and this end 34a/34b constructed in the form of a flap is in turn adhered or welded to the side facing it of the support frame 7.

Only those parts of the fourth embodiment of the bellows as illustrated in FIGS. 8 and 9 which are necessary for the explanation of this embodiment are shown in the fully extended (i.e. unfolded) position. Whilst the outer cover element 43 of this bellows cover 32 is constructed and arranged as in the preceding embodiments, the inner cover element 44 mounted firmly on the inner surface of the outer cover element 43 consists of a first sheet 45 (intermediate or connecting sheet) and a second sheet 46 which is formed—in the same way as in the preceding embodiments—by the plastic sheet perforated along the outer and inner pleat edges and is firmly connected, preferably adhered, to the first sheet 45 only in the region of every second perforation 46c' (i.e. preferably over the whole length of an appertaining outer pleat edge). By contrast at least some of the perforations 46c lying therebetween are broken for the purpose of forming flap-like ends 46a, 46b for the support frames 7. In the example according to FIG. 8 the outer edge 7a of each support frame 7 lies along a perforation 46c' intended for the formation of an outer pleat edge, along a mounting point of the first sheet 45, whilst the adjacent perforations 46c arranged on both sides of this perforation 46c' are broken so that the corresponding sections of the second sheet 46 each form a flaplike end 46a, 46b and can be folded inwards for a connection to the two end faces of the support frame 7—corresponding to the arrows shown in broken lines—so that in the finished connected position the two flap-like ends 46a, 46b project freely from the region of the inner cover element 44 which is connected to the outer cover element 43 towards the interior of the bellows and receive the relevant support frame 7—reliably mounted.

In bellows in which less severe demands are made on the stable mounting of the support frames 7 it can also be sufficient if in each case only one flap-like end 46a or 46b is constructed—by corresponding separation at the perforations 46c—for a level connection to the support frame 7. It is also conceivable that—viewed over the length of the bellows cover 42—a perforation 46c could be provided only along each second pleat edge, i.e. along each inner pleat edge, whilst along the outer pleat edge constructed therebetween in each case (i.e. in the region 46c') only thinner points or prefolds could be provided for example and along these points the firm connection between the first and second sheets 45 and 46 is provided; in FIG. 9 these possibilities are indicated by lines consisting of longer or shorter dashes.

Figure 10:
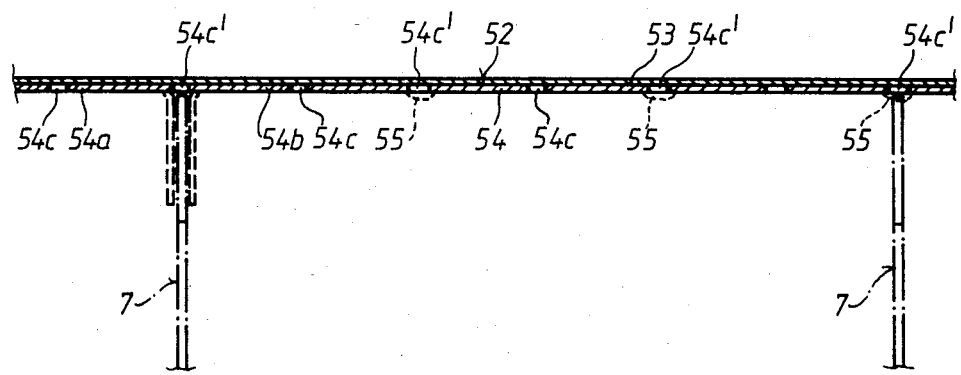
FIG. 10 shows a further partial longitudinal sectional view through the fully extended bellows in explanation of a fifth embodiment.

FIG. 10 shows a fifth embodiment which is largely merely a simplification of the embodiment explained above with reference to FIGS. 8 and 9. In this case the inner cover element 54 of the bellows 52 which is mounted on the inner surface of the outer cover element 53 is only formed by one single plastic sheet which is perforated along the outer and inner pleat edges. The inner cover element 54 thus formed is merely connected firmly in the region of each second perforation 54c' (and preferably over the entire length of this perforation) to the outer cover element 53. This connection to the outer cover element 53 can be made in any suitable manner; adhesion has proved particularly simple but nevertheless reliable since after the inner cover element 54 has been placed on the outer cover element 53 the adhesive can be applied through the corresponding perforations 54c'. There is no firm connection to the outer cover element 53 in the region of the perforations 54c lying therebetween in each case nor essentially on the surfaces of the sections of sheet lying therebetween. So that in this case too the flap-like ends can be constructed for a level connection to the support frames 7 to be provided here, the perforation 54c which is not connected to the outer cover element 53 and belongs to a section 54a and/or 54b intended for the construction of a flap-like end merely needs to be separated, so that—as indicated in the example according to FIGS. 8 and 9 and indicated by broken lines and arrows—the corresponding sections are folded as flap-like ends 54a or 54b in the direction towards the interior of the bellows and thus folded against the end face of the support frame 7 facing them in order to produce the desired level connection to the appertaining support frame 7.

The particular advantage of the two embodiments according to FIGS. 8 and 9 on the one hand and FIG. 10 on the other hand resides in the fact that first the inner and outer cover elements can be connected to the bellows cover and only then can the points on the bellows be determined at which support frames or other support members are to be arranged, i.e. only when the mounting points for the support frames are fixed are the flap-like ends constructed on the inner cover element by merely separating corresponding perforations and folding the sections thus formed in the direction of the interior of the bellows and thus against the support frame. This therefore means a further simplification as regards the production of a bellows.

It should also be emphasised in particular that both the connection between flap-like ends and support members and between the sheets of the inner cover element and the outer cover element of the bellows cover can be produced by any suitable means, but especially by adhesion or welding. In the embodiments according to FIGS. 6 to 10 attention is merely given in each cases to the particular construction of the bellows cover and above all to the particular construction of the inner cover element with its flap-like ends and to the connection between these flap-like ends and the appertaining support members. In these further embodiments the rest of the bellows with the support members can be constructed in the same way as has been explained in connection with the first embodiment, particularly on the basis of FIGS. 1 to 3.

Figure 11:
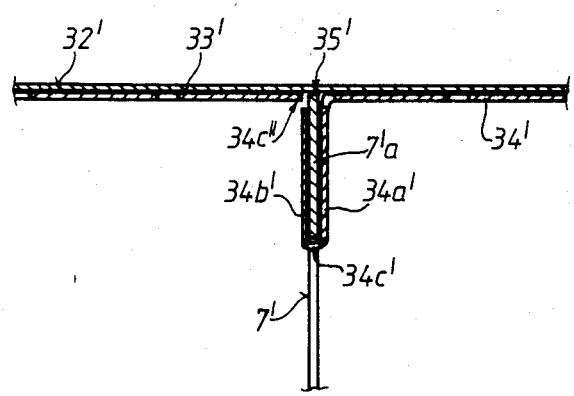
FIG. 11 shows a partial longitudinal sectional view in explanation of a variant of the embodiment shown in FIG. 7.

A variant of the embodiment explained with the aid of FIG. 7 is described with reference to FIG. 11. For the sake of simplicity the individual parts and elements in FIG. 11 are provided with the same reference numerals as in FIG. 7 but modified by prime. In this embodiment according to FIG. 11 the inner cover element 34' which is connected to the outer cover element 33' of the cover 32' can again be formed by a single sheet which is perforated along the outer and inner pleat edges of the bellows or by parts arranged adjacent to one another in the longitudinal direction of the bellows. In the production of the inner cover element 34' pleats which are laid close together and directed towards the interior of the bellows are constructed at those points on the bellows at which a support frame 7' is to be arranged and fixed, each of these pleats consisting of two sections 34a' and 34b' of the sheet which are adjacent to one another and connected to each other by a perforation 34c', so that these two sections 34a', 34b' form the flap-like mounting ends of the inner cover element 34' at this point. However, in this case the sections 34a' and 34b' which are thus folded together and directed towards the interior of the bellows are not connected to each other on their surfaces which face each other, but by separating one perforation 34c'' along the relevant outer pleat edge 35' a pocket which is open towards the cover 32' is formed, and the section 7'a of the support frame is inserted from the interior of the bellows into this pocket, whereupon it can be connected to the sections 34a' and 34b' which form the flap-like ends. In this case support members or support frames 7' are preferably provided, the height thereof in the region of the pleats being somewhat less than the height of the pleats.

In the explanation of the first embodiment, especially as regards the illustration in FIG. 1, it is assumed that the bellows 1 shown there is intended to serve for the protection of a flat guideway having an approximately rectangular cross-section of a machine tool. However, any embodiment of the bellows according to the invention can be adapted to any cross-sections of guideways, columns, spindles or the like, and in the case of columns or spindles the bellows has a closed cross-sectional shape. If for example a guide column having a square cross-section is to be protected by the bellows according to the invention, then the bellows can be prefabricated e.g. from two parts which are approximately U-shaped in cross-section and are then assembled without difficulty on the column to be protected so as to form a stable bellows, and the plurality of support frames or support members are arranged between flap-like ends of the inner cover element, which are provided for this purpose and project towards the centre of the bellows, and are adhered or welded to the corresponding ends. At these separation points on the bellows the parts located there of the relatively thin support members or support frames can overlap, or it is also possible for correspondingly projecting sections of the support members to project in each case between corresponding flap-like ends of the opposing bellows part and to be fixed there. In the construction according to the invention the flap-like ends which are provided in order to receive and connect the support members (and in a way form a kind of mounting pocket) can be prefabricated in the general production of the bellows in such a way that the arrangement and mounting of the support members can be carried out simply and without any problems during assembly of the bellows. Naturally, the same procedure can be followed in the case of spindles and columns with a circular or polygonal cross-section, and it is equally possible for a bellows with a circular ring-shaped cross-section or a polygonal cross-section to be split at one single point in the longitudinal direction or left open so that the bellows can be placed round the corresponding guide member during installation.

Numerous further variants and constructions of this bellows are possible. With regard to the modification of the example according to FIG. 7 which is described with the aid of FIG. 11, a further variant is possible in such a way that the sections 34a, 34b of the inner cover element 34 made from the continuous perforated sheet which are connected to each other by a perforation 34c are folded close to each other thus forming the inwardly-directed flap-like ends 34a, 34b but are not connected level with each other so that to a certain extent they form pocket-like mountings and are connected—by perforation—to the other sections of the sheet. In this case the support members or support frames can be inserted approximately from the long side of the bellows into the appropriate pocket-like constructions of the flap-like ends. This embodiment is also particularly advantageous in the divided construction of the support members or support frames described above in relation to FIG. 1, so that for example one part of the support frame is pushed into the corresponding region of the bellows cover from each long side of the bellows. If the bellows is constructed with bends—viewed in cross-section - then the connected sections or flap-like ends merely need to be appropriately separated in the region of the corresponding arms of the bellows. The thin parts which form a whole support member can overlap to provide stablisation in the region of a transverse separation point or in the central transverse region.

Figure 12:
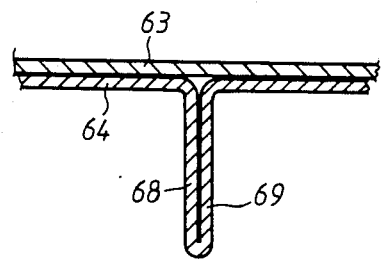
FIGS. 12, 13 and 14 show similar partial sections through further embodiments.
Figure 13:
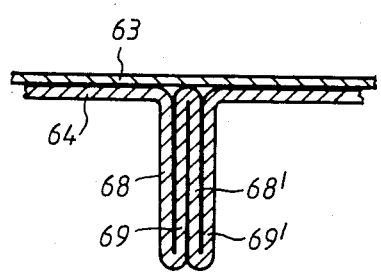
Figure 14:
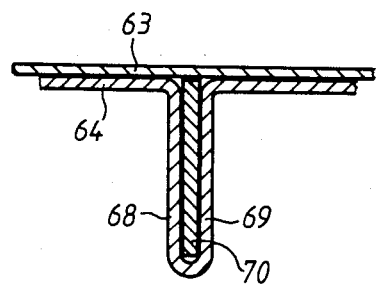

In the embodiment according to FIG. 12 the cover of the bellows consists of an outer cover element 63 and an inner cover element 64 having flap-like ends 68, 69 which themselves form the support member. In the construction according to FIG. 12 the flap-like ends 68, 69 are formed by simple pleating of the inner cover element 64, whereas in the variant according to FIG. 13 the flap-like ends 68, 69, 68', 69' are produced by double pleating of the inner cover element 64. Finally, in the variant according to FIG. 14 a stiffening 70 is inserted into the pleat forming the flap-like ends 68, 69 of the inner cover element 64.

In the bellows according to the invention the outer cover element can also be formed by a close flexible steel netting which protects the bellows particularly well against hot shavings. Another possibility is that the outer cover element (which in this case can be made for example from a plastic sheet or a textile fabric) can be provided on its outer surface with applied metal strips which serve both as surface protection and to protect the bellows above all against damage caused by hot shavings striking it.

We claim:

1. An elongate bellows comprising a pleated outer cover member and a correspondingly pleated inner cover member having confronting portions secured to each other, said inner cover member having a length greater than that of said outer cover member, said inner cover member having its excess length taken up by longitudinally spaced apart flap-like sections that are unsecured to said outer cover member and extend transversely and inwardly of said outer cover member.

2. A bellows according to claim 1 wherein said inner cover member is transversely perforated adjacent each of said flap-like sections.

3. A bellows according to claim 1 including a reinforcement adjacent and secured to each of said flap-like sections.

4. A bellows according to claim 3 wherein said reinforcement is formed by a plurality of said flap-like sections.

5. A bellows according to claim 3 wherein said reinforcement comprises a support member separate from said flap-like sections.

6. A bellows according to claim 5 wherein said support member is discontinuous in length.

7. A bellows according to claim 5 wherein said support member and the adjacent flap-like section are substantially coextensive in area.

8. A bellows according to claim 1 wherein that portion of said inner cover member which is secured to said outer cover member terminates at each end in one of said flap-like sections.

9. A bellows according to claim 8 wherein adjacent ones of said flap-like sections are uncut.

10. A bellows according to claim 9 including a reinforcement accommodated between said adjacent ones of said sections.

11. A bellows according to claim 8 wherein adjacent ones of said flap-like sections are separate from one another.

12. A bellows according to claim 1 wherein said inner cover member comprises a single sheet.

13. A bellows according to claim 1 wherein said inner cover member comprises a pair of sheets, one of which confronts and is coextensive in length with said outer cover member.

14. A bellows according to claim 1 including a reinforcement secured to each of said flap-like sections, at least some of said reinforcements projecting inwardly a distance greater than the associated flap-like section.

15. A bellows according to claim 14 including guide means carried by selected ones of said reinforcements at their inner ends.

16. A bellows according to claim 1 wherein each of said flap-like sections is formed by folding said inner cover member a number of times to form a pocket.

17. A bellows according to claim 16 including a reinforcing member accommodated in said pocket.

18. A bellows according to claim 1 wherein said outer cover member comprises flexible metal netting.

19. A bellows according to claim 1 wherein said outer cover member has metal strips secured to its outer surface.

* * * * *